(12) United States Patent
Zuo

(10) Patent No.: US 11,343,365 B2
(45) Date of Patent: May 24, 2022

(54) ELECTRONIC DEVICE WITH FLEXIBLE EXPANDABLE DISPLAY

(71) Applicant: GUANGDONG OPPO MOBILE TELECOMMUNICATIONS CORP., LTD., Dongguan (CN)

(72) Inventor: Zhouquan Zuo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/313,306

(22) Filed: May 6, 2021

(65) Prior Publication Data
US 2021/0258412 A1    Aug. 19, 2021

Related U.S. Application Data

(63) Continuation of application No. PCT/CN2019/124931, filed on Dec. 12, 2019.

(30) Foreign Application Priority Data

Dec. 29, 2018    (CN) .......................... 201811647024.0

(51) Int. Cl.
H04M 1/02         (2006.01)

(52) U.S. Cl.
CPC ....... *H04M 1/0268* (2013.01); *H04M 1/0235* (2013.01); *H04M 1/0277* (2013.01); *H04M 2201/38* (2013.01)

(58) Field of Classification Search
CPC ............. H04M 1/0268; H04M 1/0235; H04M 1/0277; H04M 2201/38; G06F 1/1652; G06F 1/1643; G06F 1/1624; H05K 5/0017
See application file for complete search history.

(56) References Cited

U.S. PATENT DOCUMENTS

2013/0127799 A1*  5/2013  Lee .................. G06F 1/1652
                                                          345/204
2017/0212607 A1*  7/2017  Yoon ................ G06F 1/1652

FOREIGN PATENT DOCUMENTS

CA           2924171 A1    9/2016
CN         105979037 A     9/2016
(Continued)

OTHER PUBLICATIONS

International Search Report and Written Opinion dated Mar. 12, 2020 in International Application No. PCT/CN2019/124931. English translation attached.

(Continued)

*Primary Examiner* — Ankur Jain
*Assistant Examiner* — Angelica M Perez
(74) *Attorney, Agent, or Firm* — Sheppard, Mullin, Richter & Hampton LLP

(57) ABSTRACT

An electronic device is provided. The electronic device includes a main body, a rotating member, a flexible display screen, and a flexible circuit board. The main body has a pillar shape. An outer periphery of the main body has a groove provided thereon. The rotating member is sleeved on an outside of the main body and is configured to drive the flexible display screen to be wound or unfolded relative to the rotating member. When the flexible display screen is unfolded, the flexible circuit board is unfolded along with the flexible display screen, and when the flexible display screen is wound, the flexible circuit board is wound into the groove along with the flexible display screen.

18 Claims, 13 Drawing Sheets

(56) References Cited

FOREIGN PATENT DOCUMENTS

| | | | |
|---|---|---|---|
| CN | 106023813 A | * 10/2016 | ............... G09F 9/30 |
| CN | 106023813 A | 10/2016 | |
| CN | 107331301 A | 11/2017 | |
| CN | 107528945 A | * 12/2017 | |
| CN | 107528945 A | 12/2017 | |
| CN | 108877532 A | 11/2018 | |
| EP | 3480802 A1 | 5/2019 | |
| WO | 2018006709 A1 | 1/2018 | |

OTHER PUBLICATIONS

First Office Action from corresponding Chinese Application No. 201811647024.0, dated Sep. 24, 2020. English translation attached.
Intent to Grant from corresponding Chinese Application No. 201811647024.0, dated Apr. 20, 2021. English translation attached.
Extended European Search Report dated Nov. 12, 2021 received in European Patent Application No. EP 19904952.9.

* cited by examiner

ELECTRONIC DEVICE WITH FLEXIBLE EXPANDABLE DISPLAY

The present application is a continuation of International Application No. PCT/CN2019/124931, filed on Dec. 12, 2019, which claims priority to Chinese Patent Application No. 201811647024.0, titled "ELECTRONIC DEVICE", filed with Chinese National Intellectual Property Administration on Dec. 29, 2018, the entire disclosure of which is incorporated herein by reference.

TECHNICAL FIELD

The present disclosure relates to a field of communication technologies, and more particularly, to an electronic device.

BACKGROUND

With development of communication technologies, electronic devices such as smart phones are becoming increasingly popular. Electronic devices tend to be flat with serious homogeneity. With increasingly diversified functions of electronic devices, an overall structure of the electronic devices has been unable to meet needs of different users.

SUMMARY

Embodiments of the present disclosure provide an electronic device, which is capable of improving diversity of electronic devices.

An embodiment of the present disclosure provides an electronic device. The electronic device includes a main body, a rotating member, a flexible display screen and a flexible circuit board. The main body has a pillar shape, and an outer periphery of the main body has a groove provided thereon. The rotating member is sleeved on an outside of the main body. The flexible display screen has an end connected to the rotating member, and the rotating member is configured to drive the flexible display screen to be wound or unfolded relative to the rotating member. The flexible circuit board is connected to the flexible display screen. When the flexible display screen is unfolded, the flexible circuit board is unfolded along with the flexible display screen, and when the flexible display screen is wound, the flexible circuit board is wound into the groove along with the flexible display screen.

An embodiment of the present disclosure further provides an electronic device. The electronic device includes a main body, a rotating member, a flexible display screen, a processor and a flexible circuit board. The main body has a pillar shape, and an outer periphery of the main body has a groove provided thereon. The rotating member is sleeved on an outside of the main body. The flexible display screen has an end connected to the rotating member, and the rotating member is configured to drive the flexible display screen to be wound or unfolded relative to the rotating member. The processor is coupled to the rotating member and configured to control a movement of the rotating member in accordance with a control instruction. The flexible circuit board is connected to the flexible display screen. When the flexible display screen is unfolded, the flexible circuit board is unfolded along with the flexible display screen, and when the flexible display screen is wound, the flexible circuit board is wound into the groove along with the flexible display screen.

BRIEF DESCRIPTION OF DRAWINGS

In order to clearly explain technical solutions of embodiments of the present disclosure, drawings used in the embodiments are briefly described below. Apparently, the drawings as described below are merely some embodiments of the present disclosure. Based on these drawings, other drawings can be obtained by those skilled in the art without creative effort.

DESCRIPTION OF EMBODIMENTS

Technical solutions of embodiments of the present disclosure are clearly and fully described below in combination with drawings of the embodiments of the present disclosure. Apparently, the embodiments described here are only part of the embodiments of the present disclosure and are not all embodiments of the present disclosure. On a basis of the embodiments of the present disclosure, other embodiments obtained by those skilled in the art without creative effort are within the scope of the present disclosure.

Embodiments of the present disclosure provide an electronic device 100, which will be described in detail below. The electronic device 100 may be a device such as a smart phone or a smart computer.

Figure 1:
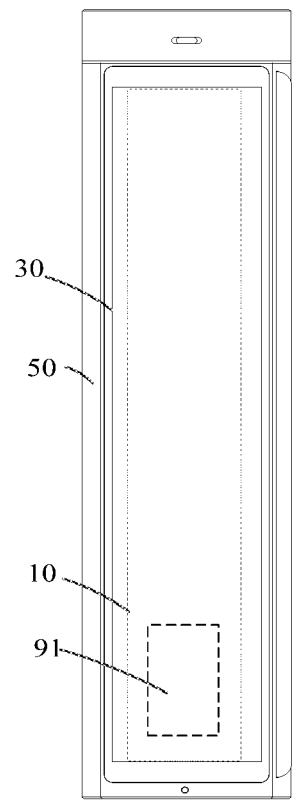
FIG. 1 is a schematic structural diagram of an electronic device having its flexible display screen wound according to an embodiment of the present disclosure.
Figure 2:
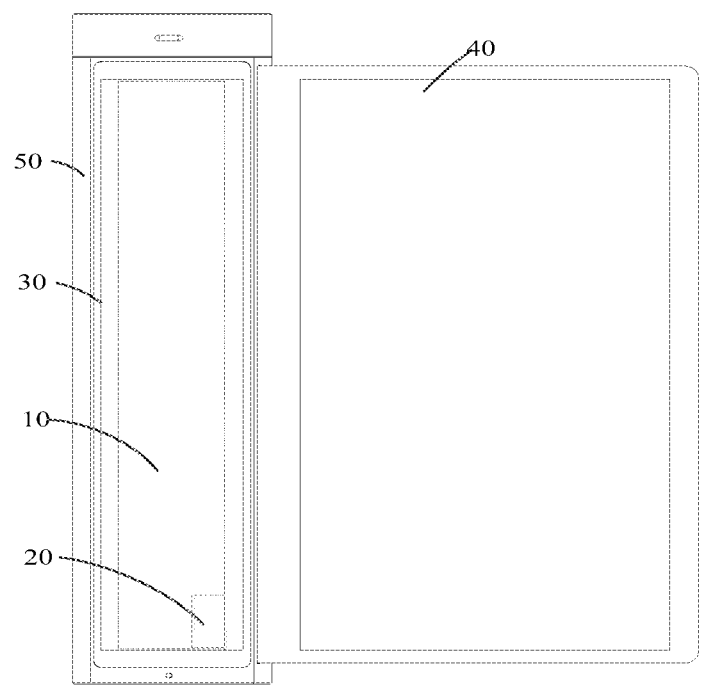
FIG. 2 is a schematic structural diagram of an electronic device having its flexible display screen unfolded according to an embodiment of the present disclosure.

Referring to FIG. 1 and FIG. 2, FIG. 1 is a schematic structural diagram of having its flexible display screen wound an electronic device according to an embodiment of the present disclosure, and FIG. 2 is a schematic structural diagram of an electronic device having its flexible display screen unfolded according to an embodiment of the present disclosure.

The electronic device 100 can include a main body 10, a rotating member 30, a transmission mechanism 20, a flexible display screen 40, a processor 91 and a housing 50. The main body 10, the rotating member 30, the transmission mechanism 20, the flexible display screen 40, and the processor 91 are arranged in the housing 50. It is to be noted that the electronic device 100 is not limited to the above descriptions. The electronic device 100 can include more components. For example, the electronic device 100 can include a camera, a circuit board, a sensor, and so on. In some embodiments, the circuit board is arranged in the housing 50, and the processor 91 is arranged on the circuit board. In some embodiments, the camera can be connected to the circuit board to implement photographing, video recording, or feature recognition of a person. In some embodiments, the electronic device 100 as a whole can have a pillar structure, such as a cylindrical shape, a truncated cone shape, a polyhedron, and the like.

It is to be noted that in the description of the present disclosure, unless specified or limited otherwise, terms "mounted," "connected," and "coupled" should be understood broadly, such as fixed, detachable, or integrated mountings, connections and couplings, can be mechanical or electrical mountings, connections and couplings, or mutual communications, and can also be direct and via media indirect mountings, connections, and couplings, and further can be inner mountings, connections and couplings of two components or interaction relations between two components. For those skilled in the art, specific meanings of the above terms in the present disclosure can be understood based on specific circumstances.

Figure 3:
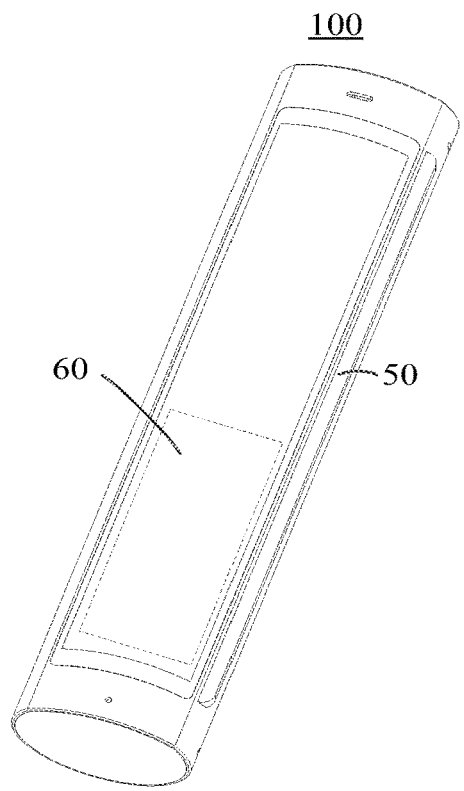
FIG. 3 is a schematic structural diagram of an electronic device according to an embodiment of the present disclosure.
Figure 4:
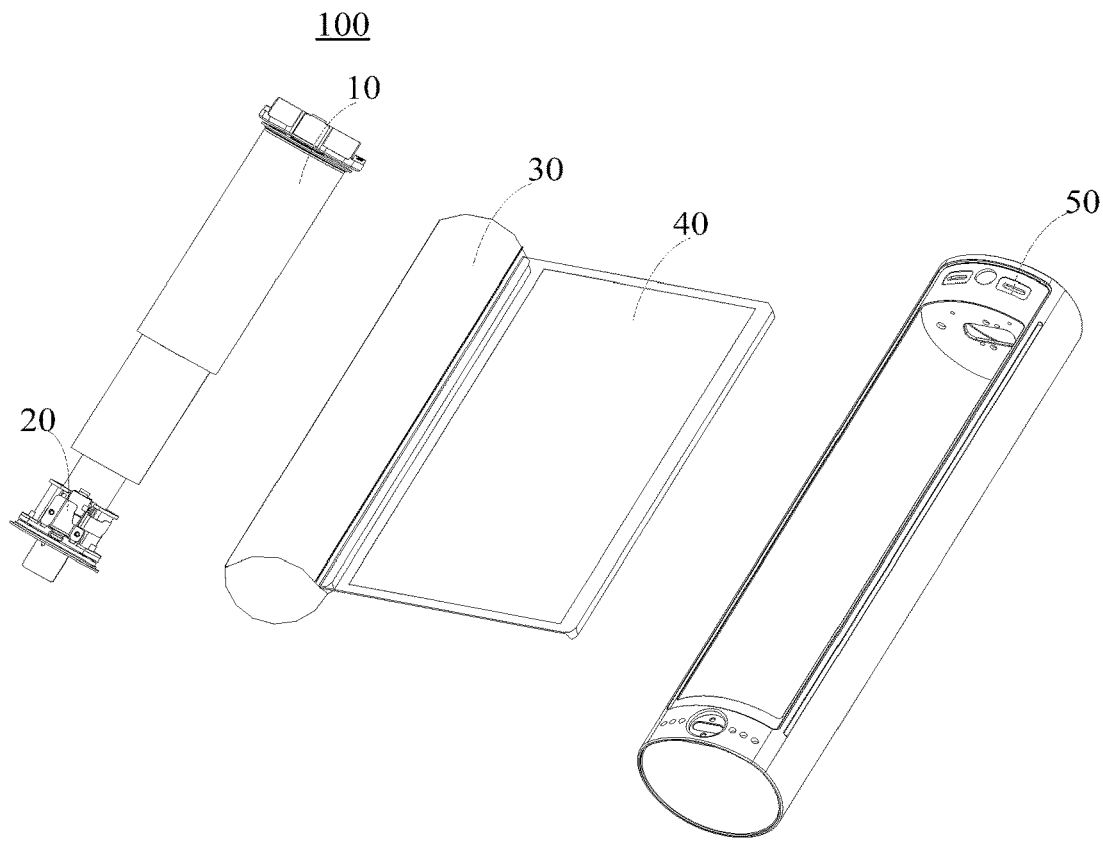
FIG. 4 is a structural exploded view of an electronic device according to an embodiment of the present disclosure.

Referring to FIG. 3 and FIG. 4, FIG. 3 is a schematic structural diagram of an electronic device according to an embodiment of the present disclosure, and FIG. 4 is a structural exploded view of an electronic device according to an embodiment of the present disclosure.

The electronic device 100 includes the main body 10, the transmission mechanism 20, the rotating member 30, and the flexible display screen 40. The main body 10 is arranged in the housing 50. The transmission mechanism 20 is arranged at either end of the main body 10, and is located in the housing 50. The rotating member 30 is sleeved on an outer periphery of the main body 10. The transmission mechanism 20 is connected to the rotating member 30. The flexible display screen 40 is fixedly connected to the rotating member 30. The rotating member 30 can drive the flexible display screen 40 to be wound or unfolded.

Figure 5:
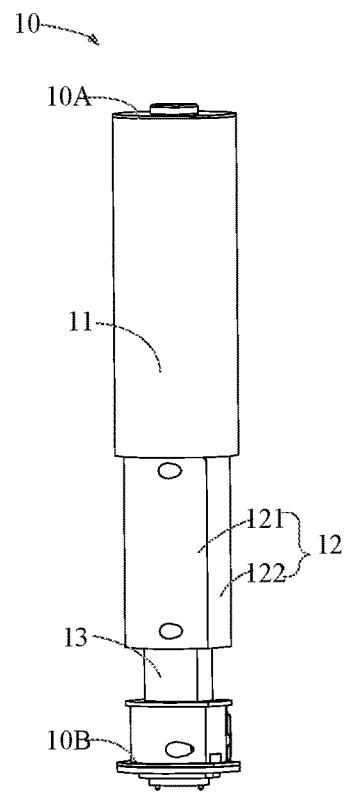
FIG. 5 is a schematic structural diagram of a main body of an electronic device according to an embodiment of the present disclosure.

Referring to FIG. 5, FIG. 5 is a schematic structural diagram of a main body of an electronic device according to an embodiment of the present disclosure. The main body 10 can have a shape of a cylinder, a cuboid, a polyhedron, or the like. That is, the main body 10 can have a cross-sectional area in various shapes such as a circle, a rectangle, a square, or a polygon. In an embodiment of the present disclosure, a specific shape of the cross-sectional area of the main body 10 is not specifically limited. In order to illustrate the embodiments of the present disclosure, unless otherwise specified, the main body 10 may be assumed to be a cylindrical body according to an embodiment of the present disclosure.

In some embodiments, the main body 10 can have a first end 10A and a second end 10B that are opposite to each other. In an embodiment of the present disclosure, directions pointed by the first end 10A and the second end 10B are interchangeable. In order to illustrate an embodiment of the present disclosure, unless otherwise specified in the present disclosure, the first end 10A generally refers to an upper end of the main body 10, and the second end 10B refers to a lower end of the main body 10. The main body 10 may include a plurality of portions. Specifically, the main body 10 may include one portion, two portions, three portions, or more portions. In an embodiment of the present disclosure, the number of the portions of the main body 10 is not limited herein.

In some embodiments, the main body 10 includes a first portion 11 and a second portion 12. The first portion 11 is located at the first end 10A of the main body 10. The second portion 12 is located at the second end 10B of the main body 10. The first portion 11 has a cross-sectional area greater than that of the second portion 12. It is to be noted that the first portion 11 having the cross-sectional area greater than that of the second portion 12 means that the first portion 11 has a diameter greater than that of the second portion 12. When the rotating member 30 is sleeved on an outer periphery of the housing 50, a space between the first portion 11 and the rotating member 30 is smaller than a space between the second portion 12 and the rotating member 30. An extra part of the space between the second portion 12 and the rotating member 30 compared to the space between the first portion 11 and the rotating member 30 may be used for mounting other components of the electronic device 100. For example, a package 14 of a flexible circuit board 60 can be mounted on the second portion 12. In this way, a space between the main body 10 and the rotating member 30 may be effectively utilized, thereby facilitating mounting of other functional parts of the electronic device 100.

Figure 6:
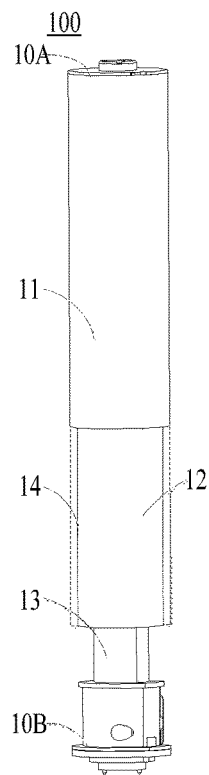
FIG. 6 is another schematic structural diagram of a main body of an electronic device according to an embodiment of the present disclosure.

Referring to FIG. 6, FIG. 6 is another schematic structural diagram of a main body of an electronic device according to an embodiment of the present disclosure. It is to be noted that the package 14 of the flexible circuit board 60 has an outer diameter identical to that of the first portion 11. Alternatively, the package 14 of the flexible circuit board 60 can have an outer diameter different from that of the first portion 11. It can be understood that the package 14 of the flexible circuit board 60 provided on the second portion 12 can be provided in various manners on the second portion 12 without interfering with rotation of the rotating member 30.

Figure 7:
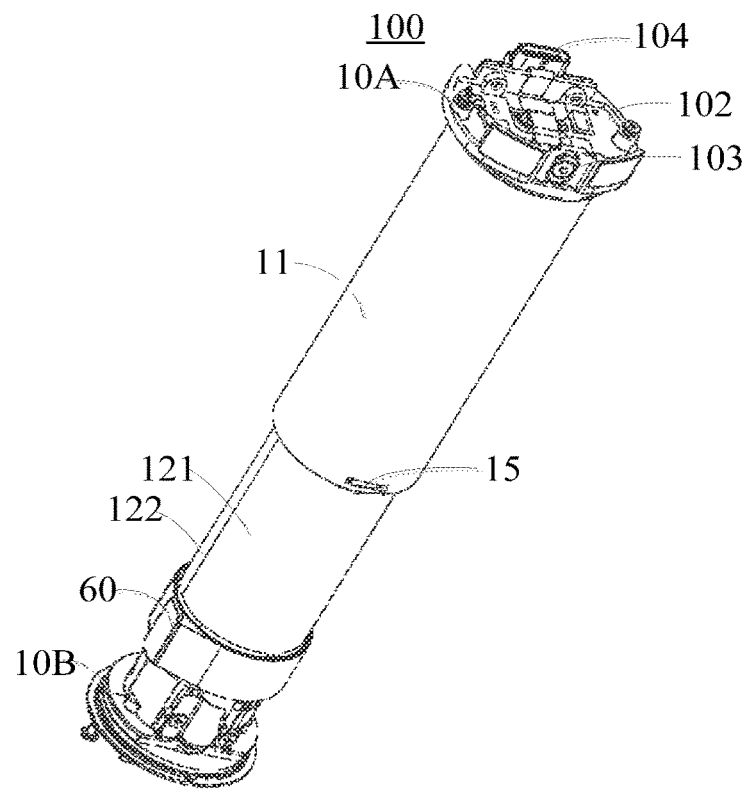
FIG. 7 is yet another schematic structural diagram of a main body of an electronic device according to an embodiment of the present disclosure.

Also referring to FIG. 7, FIG. 7 is yet another schematic structural diagram of a main body of an electronic device according to an embodiment of the present disclosure. The main body 10 has a groove 13 provided thereon. The groove 13 can be configured to place the flexible circuit board 60. In an example, the package 14 of the flexible circuit board 60 is located between the groove 13 and the first portion 11. As another example, an outline of an orthographic projection of the package 14 of the flexible circuit board 60 on an end portion of the first end 10A is smaller than a minimum cross-sectional area of the first end 10A. It is to be noted that the groove 13 can be an annular groove 13, or a rectangular groove 13, or the like. A specific shape of the groove 13 is not limited in an embodiment of the present disclosure. In an embodiment of the present disclosure, the flexible display screen 40 needs to be unfolded or wound by the rotating member 30 to change a display area of the flexible display screen 40. During unfolding or winding of the flexible display screen 40, the flexible circuit board 60 and the flexible display screen 40 need to keep energized to provide a display function. Consequently, arranging the flexible circuit board 60 in the groove 13 can enable the flexible circuit board 60 to be unfolded or wound into the groove 13 during unfolding or winding of the flexible display screen 40. Such an arrangement not only ensures that the flexible display screen 40 is maintained to be connected to the flexible circuit board 60, but also ensures that the flexible circuit board 60 is not broken when being pulled. It can be understood that, in an embodiment of the present disclosure, the groove 13 being provided as an annular groove 13 can facilitate processing. Also, providing the flexible circuit board 60 in the annular groove 13 with no obtuse angle in the flexible circuit board 60 or the annular groove 13 can prevent the flexible circuit board 60 from being easily scratched by the obtuse angle while better protecting the flexible circuit board 60.

It is to be noted that one, two or event more grooves 13 can be provided. A specific number of grooves 13 is not specifically limited in the embodiments of the present disclosure. Alternatively, the groove 13 can also be configured to place other functional parts, for example, an under-screen fingerprint module is arranged in the groove 13.

The second portion 12 includes a first mounting housing 121 and a second mounting housing 122. The first mounting housing 121 and the second mounting housing 122 are matched and fixed to form the second portion 12. The first mounting housing 121 and the first portion 11 are formed into one piece. It is to be noted that the first mounting housing 121 and the second mounting housing 122 can be fixedly connected by a fixing thread. The first mounting housing 121 and the second mounting housing 122 can also be fixedly connected by snap-fitting. Alternatively, the first mounting housing 121 and the second mounting housing 122 can also be matched and fixed in other manners. In an embodiment of the present disclosure, a through hole 15 is further formed between the first mounting housing 121 and the second mounting housing 122. The through hole 15 can allow a connecting plate 101 to pass through. In an embodiment of the present disclosure, the first mounting housing 121 and the second mounting housing 122 are matched and fixed to form the second portion 12, thereby facilitating receiving functional parts in a receiving space formed in the second portion 12.

It is to be noted that the first mounting housing 121 and the second mounting housing 122 can be formed into one piece, and the first portion 11 and the second portion 12 can also be formed into one piece.

Each of the first portion 11 and the second portion 12 of the main body 10 is provided with a receiving space therein. A first receiving space is provided inside the first portion 11. The first receiving space may receive a battery. Alternatively, the first receiving space is not limited to receiving the battery, and may also receive other functional components, for example, a camera 103, etc. A second receiving space can receive a circuit board 90. Alternatively, the second receiving space is not limited to receiving the circuit board 90, and may also receive other functional parts, for example, the under-screen fingerprint module. In an embodiment of the present disclosure, specific functional parts received in the first receiving space and the second receiving space are not specifically limited.

Figure 8:
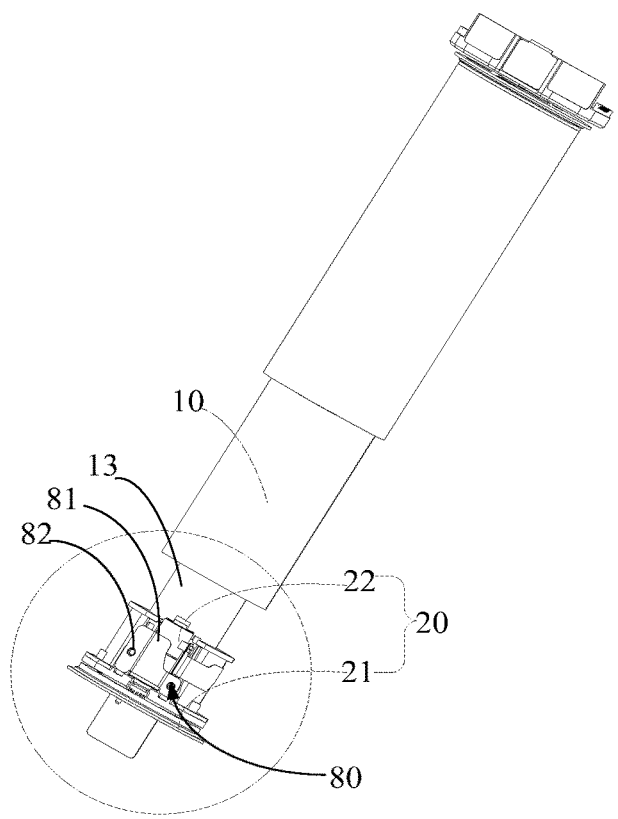
FIG. 8 is a schematic structural diagram of a transmission mechanism of an electronic device according to an embodiment of the present disclosure.

Referring to FIG. 8, FIG. 8 is a schematic structural diagram of a transmission mechanism of an electronic device according to an embodiment of the present disclosure. The transmission mechanism 20 includes a drive motor 22 and a gear set 21. The drive motor 22 is configured to drive the gear set 21 to move. The gear set 21 is configured to drive the rotating member 30 to rotate.

In some embodiments, the drive motor 22 is fixedly connected to the main body 10. The drive motor 22 is fixedly connected to the gear set 21. It can be understood that the drive motor 22 may be fixed to the main body 10 or the gear set 21 by a threaded connection. Alternatively, the drive motor 22 can also be fixed to the main body 10 or the gear set 21 in other manners, for example, by snap-fitting. Other manners of fixation will not be described in detail in an embodiment of the present disclosure.

In some embodiments, the drive motor 22 may be fixed to the main body 10 by a fixing portion 80. Specifically, the fixing portion 80 includes a bayonet 81 and a mounting plate 82. The mounting plate 82 may be located on a side of the bayonet 81. A shape of the bayonet 81 may match a shape of an outer periphery of the drive motor 22. The bayonet 81 is used for stopping the drive motor 22. The mounting plate 82 is fixedly connected to the main body 10. The drive motor 22 securely stops the electronic device 100 by the bayonet 81, and then the mounting plate 82 is fixedly connected to the main body 10 by a screw rod. In this manner, the drive motor 22 is fixed on the main body 10, and such a manner of fixed connection makes fixation more firmly.

In some embodiments, the drive motor 22 is disposed on an outer periphery of the second portion 12, and is located between the groove 13 and the gear set 21. The drive motor 22 is arranged between the groove 13 and the gear set 21, resulting in a small distance between the drive motor 22 and the gear set 21, so that the drive motor 22 is allowed to occupy a space inside the electronic device 100 as small as possible.

It is to be noted that the drive motor 22 can include one drive motor 22, two drive motors 22, or even more drive motors 22. There is no specific limit on the number of drive motors 22 in an embodiment of the present disclosure.

Figure 9:
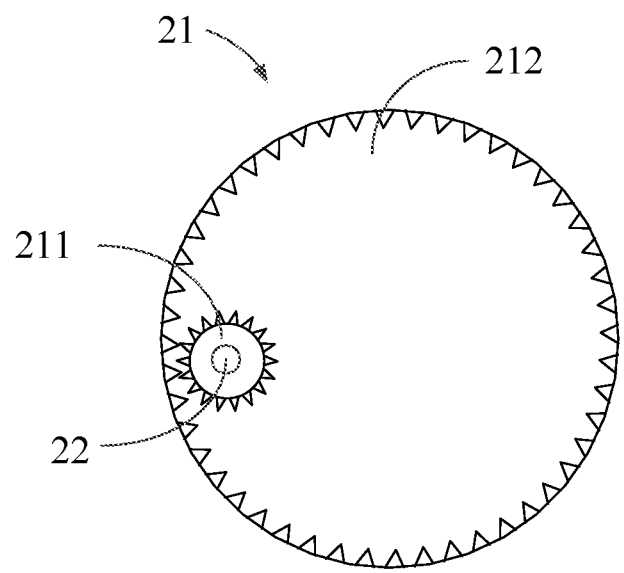
FIG. 9 is a schematic structural diagram of a gear set of a transmission mechanism of an electronic device according to an embodiment of the present disclosure.

Referring to FIG. 9, FIG. 9 is a schematic structural diagram of a gear set of a transmission mechanism according to an embodiment of the present disclosure. The gear set 21 includes a first gear 211 and a second gear 212. The first gear 211 is engaged with the second gear 212. The first gear 211 is a planetary gear. The second gear 212 is an internal gear. The first gear 211 has a diameter smaller than that of the second gear 212. The first gear 211 is fixedly connected to the drive motor 22. The second gear 212 is fixedly connected to the rotating member 30. The gear set 21 formed by two gears is driven by the drive motor 22 to drive the rotating member 30 to rotate. Since a small gear drives a large gear, torque can be increased. In this way, driving of the rotating member 30 by the gear set 21 can be achieved in a case that the drive motor 22 is as small as possible and occupies a small space.

Specifically, the first gear 211 is a planetary gear, and the second gear 212 is an internal gear. Gear teeth of the planetary gear are engaged with an inside of the internal gear. An outer periphery of the internal gear is fixedly connected to the rotating member 30. In an embodiment of the present disclosure, the first gear 211 is a planetary gear, and the second gear 212 is an internal gear. In this way, a movement of the planetary gear drives the internal gear to move, and the internal gear is fixedly connected to the rotating member 30, thereby driving the rotating member 30 to complete rotation.

Figure 10:
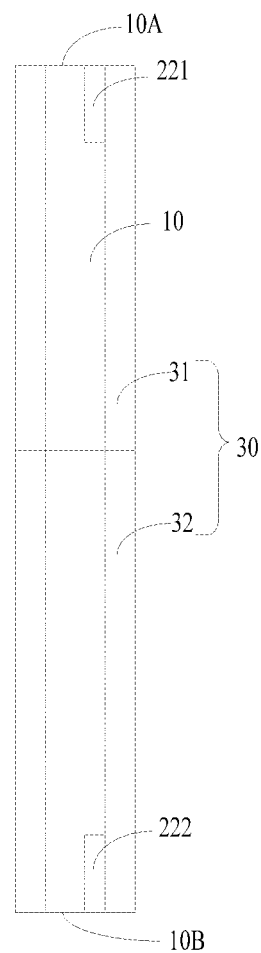
FIG. 10 is a schematic structural diagram of a rotating member of an electronic device according to an embodiment of the present disclosure.

Referring to FIG. 10, FIG. 10 is a schematic structural diagram of a rotating member of an electronic device according to an embodiment of the present disclosure. The rotating member 30 is of a cylindrical shape. Alternatively, the rotating member 30 can also have other shapes, such as a rectangle, etc. That is, the rotating member 30 can be a sleeve having a cross-sectional area of being a circle, rectangle, square, polygon, etc. A specific shape of the rotating member 30 will not be described in detail in the present disclosure.

In some embodiments, one, two, three, or even more rotating members 3 can be provided. In an embodiment of the present disclosure, a specific number of the rotating members 30 is not limited. The rotating member 30 includes a first sub-rotating member 31 and a second sub-rotating member 32. The first sub-rotating member 31 and the second sub-rotating member 32 move independently. It can be understood that the first sub-rotating member 31 can be mounted with an independent flexible display screen 40, and the second sub-rotating member 32 is mounted with an independent flexible display screen 40. In this way, split-screen display of the electronic device 100 can be achieved by driving the first sub-rotating member 31 and the second sub-rotating member 32 correspondingly.

A specific application manner may be that, for example, when the electronic device 100 does not check too much information, only one of the sub-rotating members 31, 32 needs to be rotated out, in order to unfold one flexible display screen 40 for displaying a picture. For example, when time or information needs to be checked only, only one flexible display screen 40 needs to be unfolded by one rotating member 30 for display. When a large area of a display region is required, the first sub-rotating member 31 and the second sub-rotating member 32 are rotated together, so that the flexible display screens 40 mounted on the first sub-rotating member 31 and the second sub-rotating member 32 are unfolded together to display a picture together. In an embodiment of the present disclosure, the rotating members 30 are rotated out one by one to implement the split-screen display of the electronic device 100. Moreover, in this manner, the flexible display screen 40 can adjust a size of the display region on left and right sides, and can also adjust a size of the display region on upper and lower ends. The use of the split-screen display allows a user to adjust the display area of the flexible display screen 40 flexibly as needed when using the electronic device 100.

In some embodiments, the first sub-rotating member 31 and the second sub-rotating member 32 are rotated in opposite directions. In this way, the flexible display screen 40 can be driven to be unfolded or wound in opposite directions. It is to be noted that the first sub-rotating member 31 and the second sub-rotating member 32 moving in the opposite directions can enable the flexible display screen 40 to be displayed in opposite directions after the flexible display screen 40 is divided into two screens. In this way, it may be very convenient for multiple users to use the electronic device 100. For example, two people may sit face to face, watching a video with the electronic device 100 according to an embodiment of the present disclosure. When the two people sit and watch the video together, since the screen is small, the two people need to sit close to each other to watch the video. In this event, one of them tends to be farther away from the electronic device 100 when watching the video, which lowers viewing comfort. However, with the electronic device 100 according to an embodiment of the present disclosure, two people may sit opposite to each other, and each may watch one flexible display screen 40. The electronic device 100 according to an embodiment of the present disclosure may be more convenient to use in certain scenarios.

In some embodiments, the first sub-rotating member 31 and the second sub-rotating member 32 may be arranged symmetrically. In a case that the first sub-rotating member 31 and the second sub-rotating member 32 are each provided with one flexible display screen 40, the flexible display screen 40 can also be arranged symmetrically. In this way, the electronic device 100 can form two split screens having the same screen size.

Alternatively, a length of the first sub-rotating member 31 can be changed to "be greater than a length of the second sub-rotating member 32, or smaller than the length of the second sub-rotating member 32". In the case that the first sub-rotating member 31 and the second sub-rotating member 32 are each provided with one flexible display screen 40, the two flexible display screens 40 can be formed with different mounting areas. In this way, the electronic device 100 may form two split screens of different sizes.

It can be understood that three, four or more rotating members 30 can be provided, and the specific number of the rotating members 30 is not limited according to an embodiment of the present disclosure. That is, one, two, three, or even more split screens can be formed.

The shape of the rotating member 30 can be a cylinder, a cuboid, a polyhedron, and the like. That is, the cross-sectional area of the rotating member 30 may be in various shapes such as a circle, a rectangle, a square, and a polygon. In an embodiment of the present disclosure, a specific shape of the cross-sectional area of the rotating member 30 is not specifically limited. In order to illustrate the embodiments of the present disclosure, unless otherwise specified, the rotating member 30 may be assumed to be cylindrical according to the embodiments of the present disclosure.

A gap is provided between the rotating member 30 and the main body 10. Other components of the electronic device 100 can be mounted in the gap. Components mounted in the gap are not limited according to the embodiments of the present disclosure. It can be understood that the components mounted in the gap and the main body 10 cannot interfere with the rotating member 30, so as to ensure that the rotating member 30 can rotate smoothly.

In some embodiments, a first sub-drive motor 221 is provided in the first portion 11 and a second sub-drive motor 222 is provided in the second portion 12. Alternatively, mounting positions of the first drive motor 22 and the second drive motor 22 can be interchangeable. The embodiments of the present disclosure are not limited to any specific example thereof.

Referring again to FIG. 4, the flexible display screen 40 can be mounted in the housing 50, can be received in the housing 50, or can extend from an inside of the housing 50 to an outside of the housing 50. The flexible display screen 40 can display a picture. The flexible display screen 40 can display the picture inside the housing 50. The flexible display screen 40 can also display the picture outside the housing 50.

The flexible display screen 40 can be made of a flexible material. The flexible display screen 40 can be deformable. For example, the flexible display screen 40 can be bent, curved, and the like. The flexible display screen 40 can be received in the housing 50, as illustrated in FIG. 1. One end of the flexible display screen 40 may be located outside the electronic device 100, or one end of the flexible display screen 40 may be located on the housing 50 of the electronic device 100, and the other end of the flexible display screen 40 may be fixed inside the housing 50.

The flexible display screen 40 can be a touch screen display incorporating an electrode layer of a conductive capacitive touch sensor or other touch sensor parts (for example, a resistive touch sensor part, an acoustic touch sensor part, a force-based touch sensor part, a light-based touch sensor part, etc.), or can be a non-touch flexible display screen 40. Electrodes of the capacitive touch screen can be formed by an indium tin oxide pad or an array of other transparent conductive structures.

In some embodiments, when the flexible display screen 40 is received in the housing 50, the flexible display screen 40 can be displayed through a display window 51 on the housing 50. For example, when a part of the flexible display screen 40 is located at a position of the display window 51, the flexible display screen 40 may be adjacent to a side portion 50C of the housing 50 at the position of the display window 51, or may be far away from the side portion 50C of the housing 50 at the position of the display window 51. It is to be noted that when the flexible display screen 40 is received in the housing 50, the flexible display screen 40 may not be displayed, and other displays may be set at the position of the display window 51 for display.

Figure 11:
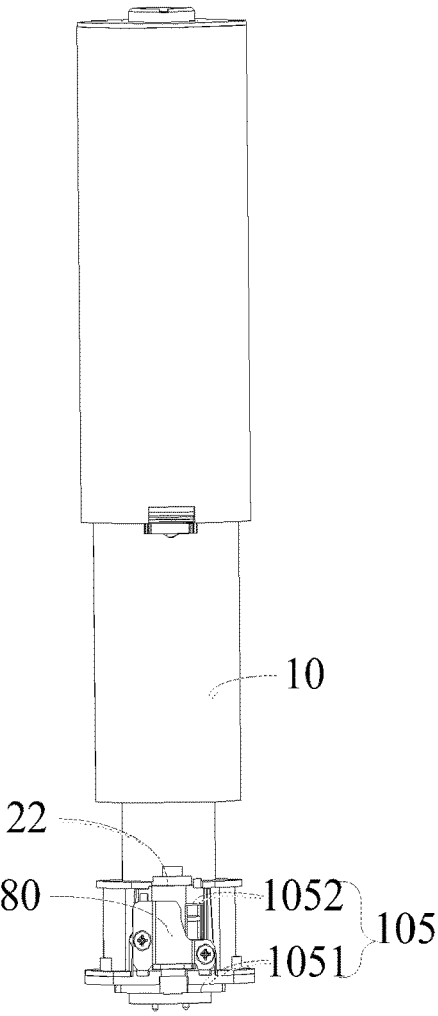
FIG. 11 is another schematic structural diagram of an electronic device according to an embodiment of the present disclosure.

Referring to FIG. 11, FIG. 11 is another schematic structural diagram of an electronic device according to an embodiment of the present disclosure. The electronic device 100 further includes an end cover 105. The end cover 105 is configured to fix the drive motor 22 and to fix the first mounting housing 121 and the second mounting housing 122. In some embodiments, the end cover 105 includes a bottom plate 1051 and a mounting portion 1052. The bottom plate 1051 is fixed at an end portion of the second end 10B. The mounting portion 1052 extends from the bottom plate 1051 to the outer periphery of the second portion 12. The drive motor 22 is mounted on the mounting portion 1052. According to an embodiment of the present disclosure, the bottom plate 1051 can be fixedly connected to the first mounting housing 121 and the second mounting housing 122 through threads, allowing the first mounting housing 121 and the second mounting housing 122 to be fixed firmly. The mounting portion 1052 extends from the bottom plate 1051 to the outer periphery of the second portion 12, thereby providing a mounting base for the drive motor 22. Such an arrangement is more convenient when the drive motor 22 is mounted on the outer periphery of the second portion 12. Also, this arrangement ensures that the drive motor 22 is firmly mounted. Consequently, the drive motor 22 can be more stable when driving the gear set 21 to work. That is, the flexible display screen 40 may be more smoothly unfolded or wound.

Figure 12:
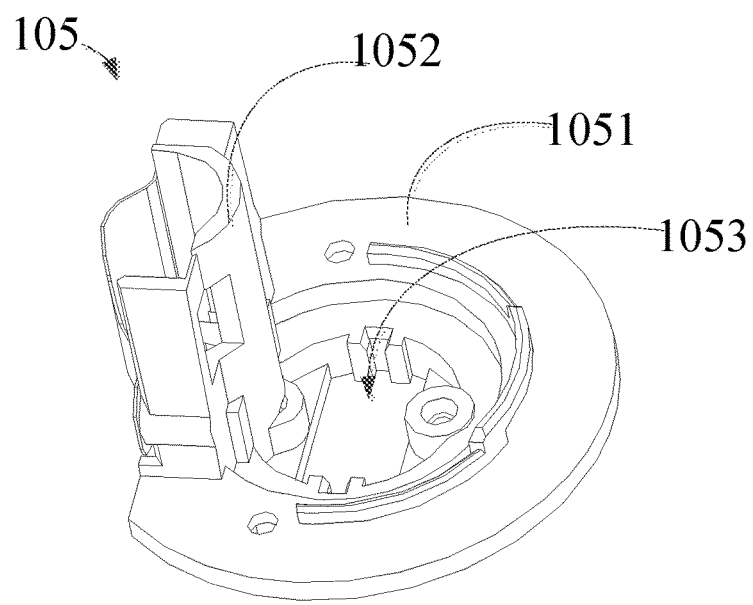
FIG. 12 is a schematic structural diagram of an end cover of an electronic device according to an embodiment of the present disclosure.

Referring to FIG. 12, FIG. 12 is a schematic structural diagram of an end cover of an electronic device according to an embodiment of the present disclosure. In some embodiments, a fixing opening 1053 is provided on the bottom plate 1051. The fixing opening 1053 is configured to fix a functional part of the electronic device 100. It is to be noted that the functional part may be the circuit board 90. The circuit board 90 is fixed in the fixing opening 1053 by snap-fitting. Specifically, the fixing opening 1053 includes a plurality of snapping openings. It can be understood that components to be fastened by each snapping opening can be different. A functional part specifically fastened to each of the plurality of snapping openings is not specifically limited according to the embodiments of the present disclosure.

Figure 13:
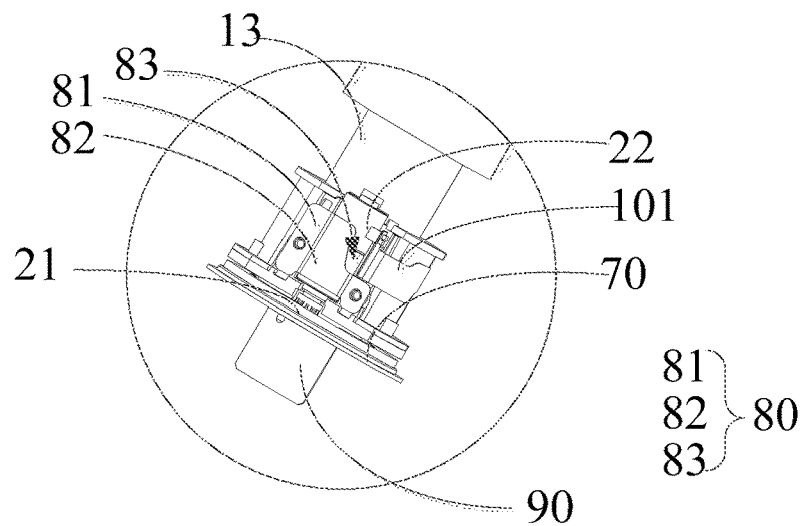
FIG. 13 is a partially-enlarged schematic diagram of an electronic device illustrated in FIG. 8.

FIG. 13 is a partially-enlarged schematic diagram of the electronic device illustrated in FIG. 8. Referring to FIG. 13, the electronic device 100 further includes a fixing cover 70 fixed on an end of the bottom plate 1051 facing away from a first end portion 50A. The fixing cover 70 may fix the rotating member 30 on the gear set 21. It can be understood that fixedly connecting the rotating member 30 to the gear set 21 through the fixing cover 70 enables the gear set 21, when rotating, to drive the rotating member 30 to rotate, thereby driving the flexible display screen 40 to be unfolded or wound. Also, using the fixing cover 70 to connect the gear set 21 with the rotating member 30 may facilitate mounting without occupying internal space of the electronic device 100.

In some embodiments, an avoiding notch 83 may be provided on the fixing portion 80. The avoiding notch 83 may be configured to avoid the connecting plate 101. Providing such avoiding notch on the fixing portion 80 may not only reduce an overall weight of the electronic device 100, but also avoid interferences when the connecting plate 101 is connecting the circuit board 90 with the drive motor 22.

Referring again to FIG. 7, the electronic device 100 further includes a bracket 102. The bracket 102 is disposed at the first end portion 50A of the main body 10. It is to be noted that the bracket 102 may be fixed at an end portion of the first end 10A connected to the main body 10. Specifically, the bracket 102 may be fixed to the end portion of the first end 10A through a threaded connection. Alternatively, the bracket 102 may also be fixed to the end portion of the first end 10A by a threaded connection. It can be understood that a specific mounting manner of the bracket 102 and the end portion of the first end 10A is not limited in the embodiments of the present disclosure.

In some embodiments, the camera 103 and a universal serial bus (USB) interface 104 may be provided on the bracket 102. Alternatively, other devices such as a sensor device may also be provided on the bracket 102. The camera 103 and the USB interface 104 may be mounted on the bracket 102. In this way, the camera 103 may be set firmly, and it is convenient for the camera 103 to shoot.

Figure 14:
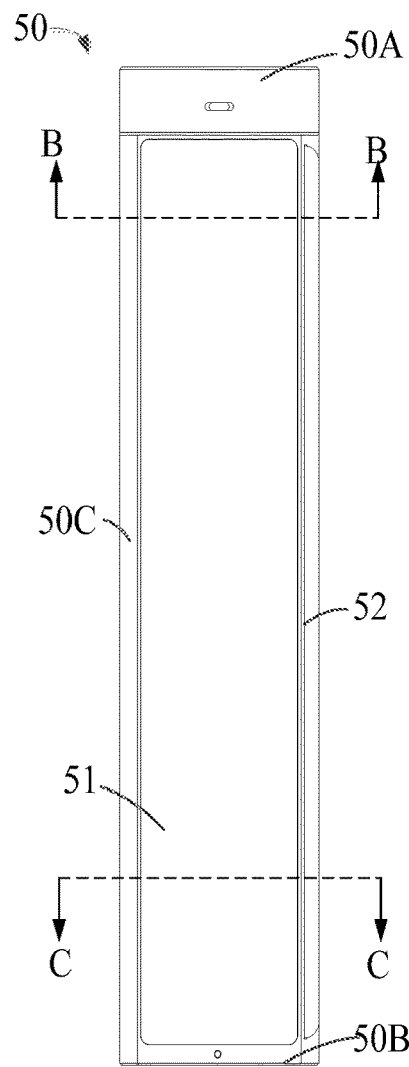
FIG. 14 is a schematic structural diagram of a housing of an electronic device according to an embodiment of the present disclosure.

Referring to FIG. 14, FIG. 14 is a schematic structural diagram of a housing of an electronic device according to an embodiment of the present disclosure. The housing 50 can be used as a carrier of the electronic device 100. The housing 50 can be made of plastic, glass, ceramic, a fiber composite material, metal (for example, stainless steel, aluminum, etc.), and other suitable materials, or a combination of any two or more of these materials.

The housing 50 can form an outer contour of the electronic device 100. The housing 50 can have a regular shape. In some embodiments, the housing 50 can have a pillar structure, or a tubular structure, such as a cylinder 10 structure, a truncated cone structure, a cone structure, a polyhedron structure, and the like. That is, a cross-sectional view of the housing 50 taken along a radial direction thereof is a circle or a polygon. It is to be noted that the housing 50 can also have an irregular shape. It is to be noted that the cross-sectional view of the housing 50 along the radial direction of the housing 50 can be a cross-sectional view surrounding a periphery of the housing 50.

When the cross-sectional view of the housing 50 along the radial direction of the housing 50 is a polygon, the polygon can be a triangle, a quadrilateral, a pentagon, or the like. When the polygon has two sides, the two sides may include a straight side and an arc-shaped side. When the polygon is a triangle or has more sides, each of the sides may be equal or unequal, or some of the sides may be equal.

The housing 50 includes at least one end portion and at least one side portion 50C. For example, the housing 50 can have the first end portion 50A, a second end portion 50B, and a first side portion 50C. The first end portion 50A and the second end portion 50B can be opposite to each other. The first end portion 50A and the second end portion 50B can be located at two opposite ends of the housing 50. The first end portion 50A and the second end portion 50B may be connected by the first side portion 50C. In other words, the first side portion 50C is connected between the first end portion 50A and the second end portion 50B.

It is to be noted that the radial direction of the housing 50 is a direction surrounding the first side portion 50C. An axial direction of the housing 50 is a direction in which the first end portion 50A faces towards the second end portion 50B, or the axial direction of the housing 50 is a direction in which the second end portion 50B faces towards the first end portion 50A. The axial direction of the housing 50 is perpendicular to the radial direction of the housing 50.

The first end portion 50A may carry the electronic device 100. For example, the first end portion 50A may have a planar structure. For another example, the first end portion 50A may have a structure with a middle portion recessed towards an inside of the electronic device 100. The first end portion 50A may carry the electronic device 100 in such a manner that the electronic device 100 is in a standing state. It is to be noted that the first end portion 50A may not carry the electronic device 100. For example, the first end portion 50A may have a pointed shape. As another example, the first end portion 50A may have a structure with a middle portion protruding towards an outside of the electronic device 100.

The second end portion 50B may carry the electronic device 100. For example, the second end portion 50B may have a planar structure. As another example, the second end portion 50B may have a structure with a middle portion recessed towards the inside of the electronic device 100. The second end portion 50B may carry the electronic device 100 in such a manner that the electronic device 100 is in a standing state. It is to be noted that the second end portion 50B may not carry the electronic device 100. For example, the second end portion 50B may have a pointed shape. As another example, the second end portion 50B may have a structure with a middle portion protruding towards the outside of the electronic device 100.

In some embodiments, at least one of the first end portion 50A and the second end portion 50B is configured to carry the electronic device 100. For example, the first end portion 50A may carry the electronic device 100, and the second end portion 50B may not carry the electronic device 100. As another example, the second end portion 50B may carry the electronic device 100, and the first end portion 50A may not carry the electronic device 100. As a further example, the first end portion 50A may carry the electronic device 100, and the second end portion 50B may carry the electronic device 100.

The first end portion 50A and the second end portion 50B may be arranged in parallel or arranged unparallelly. The first end portion 50A may have a same size as that of the second end portion 50B or have a different size from that of the second end portion 50B.

The first side portion 50C can have a cylindrical structure or a conical structure. The first side portion 50C can also have at least two mutually connected surfaces. When the first side portion 50C has two mutually connected surfaces, the first side portion 50C may include at least one arc-shaped surface. For example, the side portion 50C includes one arc-shaped surface and one flat surface. As another example, the first side portion 50C includes two arc-shaped surfaces. When the first side portion 50C has at least three mutually connected surfaces, all the surfaces of the first side portion 50C may be arc-shaped surfaces, or all the surfaces of the first side portion 50C may also be flat surfaces. Surfaces of the first side portion 50C may also be formed by connecting at least one arc-shaped surface and at least one flat surface.

It is to be noted that the electronic device 100 is carried by the first end portion 50A and the second end portion 50B, to be in the standing state. A length of the first side portion 50C is greater than that of the first end portion 50A, and greater than that of the second end portion 50B. In addition, the first side portion 50C has an area greater than that of the first end portion 50A, and greater than that of the second end portion 50B. That is, the standing state can be defined as a state in which a surface carrying the electronic device 100 has a smaller area.

Exemplarily, the first side portion 50C of the housing 50 has the display window 51 provided therein. The display window 51 can be formed by a window opened on the first side portion 50C. The display window 51 can also be formed on the first side portion 50C by a transparent material. The display window 51 can also be formed by a transparent cover plate such as a glass cover plate provided on the first side portion 50C. The inside of the electronic device 100 can be seen from the outside of the electronic device 100 through the display window 51.

When the flexible display screen 40 is wound into the housing 50, the flexible display screen 40 can be displayed in the display window 51. It can be understood that since the display window 51 opened on the housing 50 is relatively small, when the flexible display screen 40 is wound in the housing 50, the flexible display screen 40 can display relatively simple information such as time and a short message. Also, when the flexible display screen 40 is controlled to be unfolded from the inside of the housing 50 to the outside of the housing 50, a sliding operation may be performed in the display window 51 to generate a control instruction. According to an embodiment of the present disclosure, the housing 50 is opened with the display window 51. When the flexible display screen 40 is received in the housing 50, a part of the display region may be provided, and thus a part of basic information may be displayed without unfolding the flexible display screen 40. In this way, the electronic device 100 may be more practical when in use.

It is to be noted that a shape of the display window 51 can be rectangular, square, circular, or other shapes. The embodiments of the present disclosure do not limit the shape of the display window 51. It can be understood that the display window 51 according to an embodiment of the present disclosure may be arranged to include one, two, three, or even more display windows. The embodiments of the present disclosure do not limit the displayed number of the display windows 51.

In some embodiments, the housing 50 has two display windows 51 provided therein. The two display windows 51 are opposite to each other on the housing 50. Alternatively, the two display windows 51 may also be arranged at a certain angle on the housing 50. For example, an angle formed by two lines formed by connecting the two display windows 51 to an axis line, respectively, may be 60°, 90°, 120°, and so on. The embodiments of the present disclosure do not limit a specific positional relationship of the display window 51.

In some embodiments, the main body 10 is arranged at a central axis of the housing 50. It is to be noted that the main body 10 is arranged at the central axis of the housing 50, and thus the rotating member 30 rotates about a central axis of the main body 10. It can be understood that the rotating member 30 rotates about the central axis of the housing 50, such that the rotating member 30 will not be easily deflected during rotation, thereby making the rotating process more stable and making the flexible display screen 40 more stable when being rotated along with the rotating member 30. Therefore, the flexible display screen 40 of the electronic device 100 has a longer service life.

The main body 10 is fixed to the first end portion 50A of the housing 50 by the bracket 102. The main body 10 is fixedly connected to bracket 102. A reference to the above may be made for a manner of fixedly connecting the main body 10 to the bracket 102, which will not be described again.

In some embodiments, the bracket 102 is fixedly connected to the first end portion 50A of the housing 50. A specific fixed connection manner may be that, for example, the bracket 102 is fixedly connected to the first end portion 50A through a threaded connection. External threads can be provided on an outer surface of the bracket 102. Internal threads can be provided on an inner surface of the housing 50. The housing 50 is fixed on the bracket 102 through a threaded connection between the external threads of the bracket 102 and the internal threads of the housing 50. It is to be noted that the internal threads can also be provided on the inner surface of the housing 50, and the external threads can be provided on the outer surface of the bracket 102. The housing 50 is fixed on the bracket 102 through the threaded connection between the internal threads of the housing 50 and the external threads of the bracket 102.

In an example, the housing 50 is fixedly connected to the bracket 102 in a snap-fitting manner. A plurality of first snaps can be provided on the housing 50. A plurality of second snaps can be provided on the bracket 102. The housing 50 is fixed on the bracket 102 by snap-fitting of the plurality of first buckles and the plurality of second buckles.

In an example, the housing 50 is fixedly connected to the bracket 102 in a hinged manner. The housing 50 and the bracket 102 may be fixedly connected by a pin shaft.

In an example, the housing 50 is fixedly connected to the bracket 102 in a plug-in manner. A chamfering structure can be provided on the housing 50. When the housing 50 is inserted into the bracket 102, a pressing force is generated between the housing 50 and the bracket 102 so as to fixedly connect the housing 50 to the bracket 102.

It is to be noted that the housing 50 can be fixedly connected to the bracket 102 in other manners. For example, the housing 50 can also be fixedly connected to the bracket 102 by welding.

A polygon formed by a cross-sectional view of the housing 50 taken along a direction B-B or a direction C-C can be a triangle, a quadrilateral, a pentagon, a hexagon, or the like.

Figure 15:
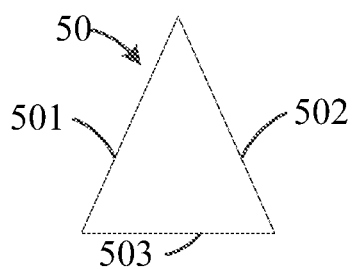
FIG. 15 is a first cross-sectional view of a housing of an electronic device illustrated in FIG. 14 taken along a direction B-B or a direction C-C.

In some embodiments, referring to FIG. 15, which is a first cross-sectional view of a housing of an electronic device illustrated in FIG. 14 taken along a direction B-B or a direction C-C, at least two sides of the polygon formed by the first cross-sectional view can be equal. For example, the first cross-sectional view of the housing 50 taken along the direction B-B or the direction C-C forms a triangle. Two sides of the triangle are approximately equal. The triangle includes a first side 501, a second side 502, and a third side 503 connected in sequence. A length of the first side 501 and a length of the second side 502 are equal. A length of the third side 503 is different from both the length of the first side 501 and the length of the second side 502. For another example, two sides of a quadrilateral are approximately equal, or three sides of the quadrilateral are approximately equal to each other.

Figure 16:
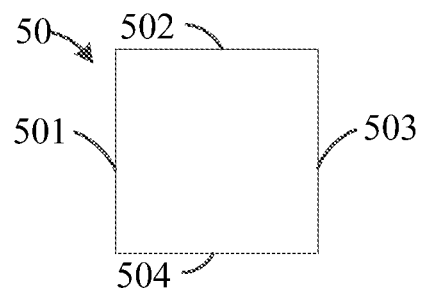
FIG. 16 is a second cross-sectional view of a housing of an electronic device illustrated in FIG. 14 taken along a direction B-B or a direction C-C.

In some embodiments, referring to FIG. 16, which is a second cross-sectional view of a housing of an electronic device illustrated in FIG. 14 taken along a direction B-B or a direction C-C, the polygon formed by the second cross-sectional view can be approximately a regular polygon. That is, lengths of respective sides of the polygon are approximately equal. For example, the second cross-sectional view of the housing 50 taken along the direction B-B or the direction C-C forms a regular quadrilateral. The regular quadrilateral has a first side 501, a second side 502, a third side 503, and a fourth side 504 connected in sequence. A length of the first side 501, a length of the second side 502, a length of the third side 503, and a length of the fourth side 504 are equal to each other.

Figure 17:
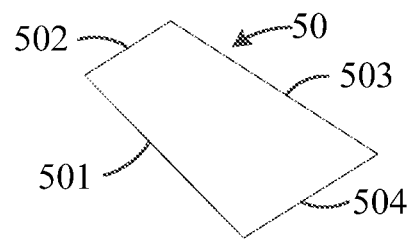
FIG. 17 is a third cross-sectional view of a housing of an electronic device illustrated in FIG. 14 taken along a direction B-B or a direction C-C.

In some embodiments, referring to FIG. 17, which is a third cross-sectional view of a housing of an electronic device illustrated in FIG. 14 taken along a direction B-B or a direction C-C, the third cross-sectional view of the housing 50 taken along the direction B-B or the direction C-C forms a polygon. The polygon may be not a regular polygon. Respective sides of the polygon may also be unequal. For example, the polygon includes a first side 501, a second side 502, a third side 503, and a fourth side 504 connected in sequence. All of lengths of the first side 501, the second side 502, the third side 503, and the fourth side 504 are unequal.

Figure 18:
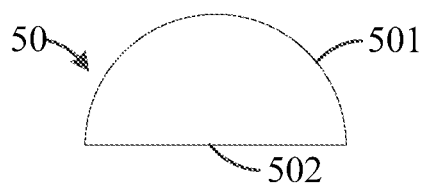
FIG. 18 is a fourth cross-sectional view of a housing of an electronic device illustrated in FIG. 14 taken along a direction B-B or a direction C-C.

In some embodiments, referring to FIG. 18, which is a fourth cross-sectional view of a housing of an electronic device illustrated in FIG. 14 taken along a direction B-B or a direction C-C, the cross-sectional view of the housing 50 taken along the direction B-B or the direction C-C may also have other shape. The cross-sectional view of the housing 50 taken along the direction B-B or the direction C-C forms at least two sides, including at least one arc-shaped side and at least one straight side. For example, the cross-sectional view of the housing 50 taken along the direction B-B or the direction C-C forms two sides, including one arc-shaped side and one straight side that are connected with each other.

Figure 19:
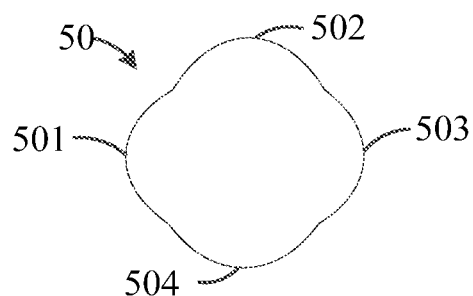
FIG. 19 is a fifth cross-sectional view of a housing of an electronic device illustrated in FIG. 14 taken along a direction B-B or a direction C-C.

In some embodiments, referring to FIG. 19, which is a fifth cross-sectional view of a housing of an electronic device illustrated in FIG. 14 taken along a direction B-B or a direction C-C, the cross-sectional view of the housing 50 taken along the direction B-B or the direction C-C may also have other shape. The cross-sectional view of the housing 50 taken along the direction B-B or the direction C-C forms at least two sides. Each of the at least two sides is an arc-shaped side. For example, a shape formed by the cross-sectional view of the housing 50 taken along the direction B-B or the direction C-C includes four arc-shaped sides, which are a first arc-shaped side, a second arc-shaped side, a third arc-shaped side, and a fourth arc-shaped side connected in sequence.

Figure 20:
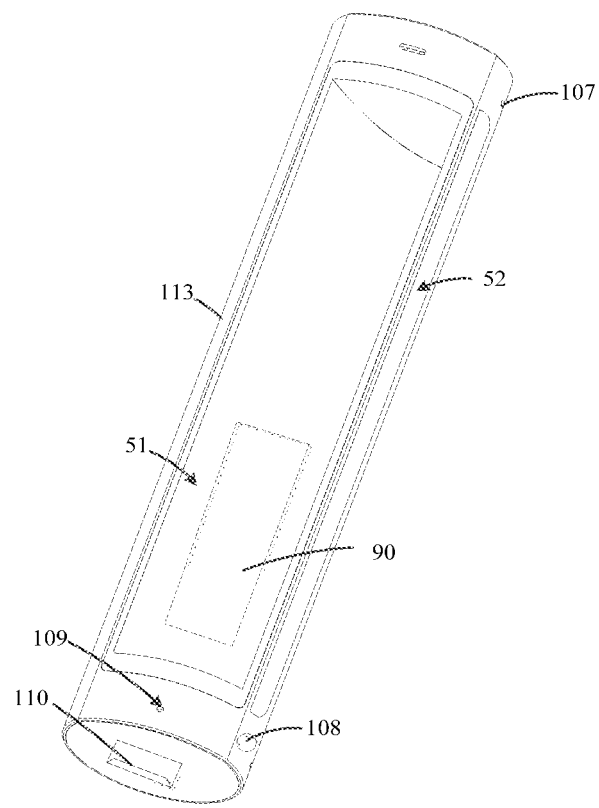
FIG. 20 is another schematic structural diagram of a housing of an electronic device according to an embodiment of the present disclosure.

Referring to FIG. 20, FIG. 20 is another schematic structural diagram of a housing of an electronic device according to an embodiment of the present disclosure. The housing 50 is provided with a button 108 on an outer surface of the housing 50 close to the second end 10B. The button 108 is electrically connected to the circuit board 90. It is to be noted that it can be understood that the button 108 can be provided at the first end portion 50A or the second end portion 50B or can be provided at the side portion 50C. It can be understood that the button 108 may include a plurality of function buttons 108, such as a sound adjustment button, or a trigger button 107. The embodiments of the present disclosure do not limit a function of the button 108 specifically.

The housing 50 is provided with a sound hole 109 of an earpiece on the outer surface of the housing 50 close to the second end 10B. The sound hole 109 of the earpiece is arranged at 360°. In view of this, sound signals may be transmitted in multiple directions.

The housing 50 is provided with a charging interface 110 on a bottom surface of the second end portion 50B of the housing 50. It can be understood that the charging interface 110 can also be arranged on a side surface of the second end portion 50B, or on a top surface of the first end portion 50A. It is to be noted that "bottom", "side" and "top" according to the embodiments of the present disclosure are only used to introduce the present disclosure, rather than limiting orientations of the present disclosure.

According to an embodiment of the present disclosure, the side portion 50C of the housing 50 further includes an outlet 52. The flexible display screen 40 is unfolded or wound from the outlet 52. When the flexible display screen 40 is received in the housing 50 completely, an edge of the flexible display screen 40 will seal the outlet 52.

Figure 21:
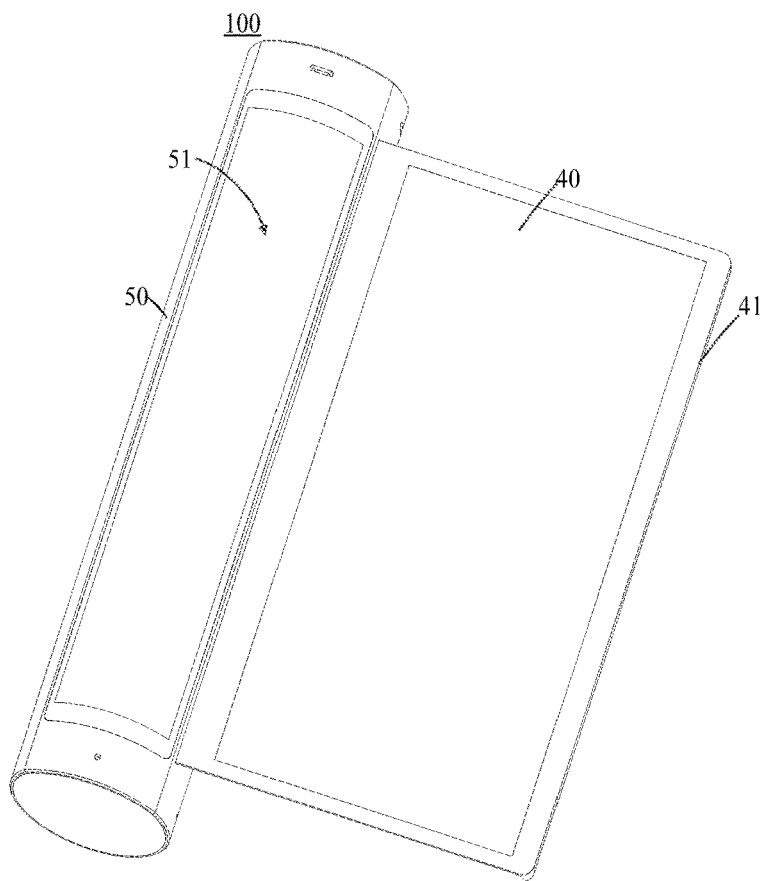
FIG. 21 is yet another schematic structural diagram of an electronic device according to an embodiment of the present disclosure.

Referring to FIG. 21, FIG. 21 is a schematic structural diagram of an electronic device according to an embodiment of the present disclosure. In some embodiments, the edge of the flexible display screen 40 is provided with a flange 41. When the flexible display screen 40 is received in the housing 50 completely, the flange 41 is clamped at the outlet 52, and the flange 41 seals the outlet 52 simultaneously. It is to be noted that the flange 41 can be made of a silicone material, a rubber material, or the like. It should be acknowledged that the material for the flange 41 is not limited to the above examples. In an embodiment of the present disclosure, the flange 41 may play a limiting role to prevent the edge of the flexible display screen 40 from being entangled into the housing 50, thereby ensuring that the flexible display screen 40 will be unfolded smoothly when the flexible display screen 40 is unfolded again. Also, the flange 41 may play a role of sealing the outlet 52, thereby achieving a waterproof and dustproof effect.

In an embodiment of the present disclosure, a driving process of unfolding or winding the flexible display screen 40 is as follows. When the flexible display screen 40 is unfolded from the inside of the housing 50 to the outside of the housing 50, the drive motor 22 moves to drive the planetary gear to move. The planetary gear is engaged with an inner gear of the internal gear so as to move the planetary gear. Thus, the planetary gear can drive an inner wheel to move. An outer periphery of the internal gear is connected to the rotating member 30. When the internal gear is moving, the rotating member 30 will also move. The rotating member 30 is fixedly connected to the flexible circuit board 60. A direction in which the rotating member 30 move is a direction in which the flexible circuit board 60 faces towards an opening. When the drive motor 22 stops moving, the flexible display screen 40 also stops continuing to be unfolded. An unfolded portion can be configured to display a screen. When the drive motor 22 continues moving, the flexible display screen 40 can continue to be unfolded until the flexible display screen 40 is unfolded fully to provide a largest display region that the electronic device 100 is capable of displaying.

When the flexible display screen 40 is wound from the outside of the housing 50 into the inside of the housing 50, the drive motor 22 can relatively move in a direction in which the flexible display screen 40 is unfolded from the inside of the housing 50 to the outside of the housing 50. The drive motor 22 drives the planetary gear to move. The planetary gear drives the inner wheel to move. The rotating member 30 moves accordingly. The rotating member 30 is fixedly connected to the flexible circuit board 60. A direction in which the rotating member 30 moves is a direction in which the flexible circuit board 60 faces towards the outlet 52. When the drive motor 22 stops moving, the flexible display screen 40 also stops continuing to be wound. When the drive motor 22 continues to move, the flexible display screen 40 may continue to be wound until the flexible display screen 40 is received in the housing 50 completely.

In an embodiment of the present disclosure, the main body 10 has a groove 13 provided therein. The gear set 21 is arranged at an end portion of either end of the main body 10. The rotating member 30 is sleeved on the outer periphery of the main body 10. The gear set 21 is connected to the rotating member 30. The flexible display screen 40 is fixedly connected to the rotating member 30. The flexible circuit board 60 is arranged in the groove 13. The flexible circuit board 60 is electrically connected to the flexible display screen 40. Movement of the gear set 21 can drive the rotating member 30 to move. The rotating member 30 can drive the flexible display screen 40 to be unfolded or wounded. The gear set 21 may be provided at an end portion of either end of the housing 50. The rotating member 30 is sleeved on the outer periphery of the housing 50. The gear set 21 is connected to the rotating member 30. The gear set 21 drives the rotating member 30 to move to achieve flexible unfolding or winding. The display area of the flexible display screen 40 may be changed by unfolding and winding of the flexible display screen 40, and thus the user can adjust the area of the display region as required. Also, since the gear set 21 is provided at an end portion of one end of the housing 50, a transmission part will not occupy the space inside the housing 50, which facilitates arranging other functional parts in the electronic device 100. In addition, arranging the flexible circuit board 60 in the groove 13 enables the flexible circuit board 60 to be unfolded or wound into the groove 13 along with the flexible display screen 40 during unfolding or winding of the flexible display screen 40. Such an arrangement not only ensures that the flexible display screen 40 is maintained to be connected to the flexible circuit board 60, but also ensures that the flexible circuit board 60 will not be broken when being pulled.

It is to be noted that it is possible to wind the flexible display screen 40 from the outside of the housing 50 to the inside of the housing 50 by a reset mechanism instead of the drive motor 22. The embodiments of the present disclosure do not limit a structure of the reset mechanism structure specifically.

Figure 22:
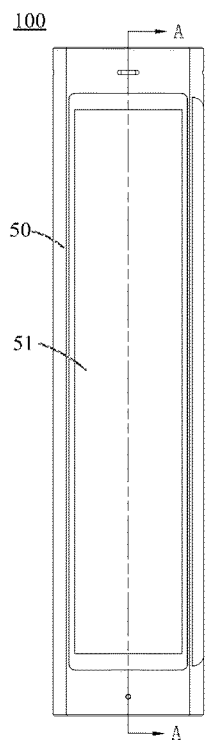
FIG. 22 is still yet another schematic structural diagram of an electronic device according to an embodiment of the present disclosure.
Figure 23:
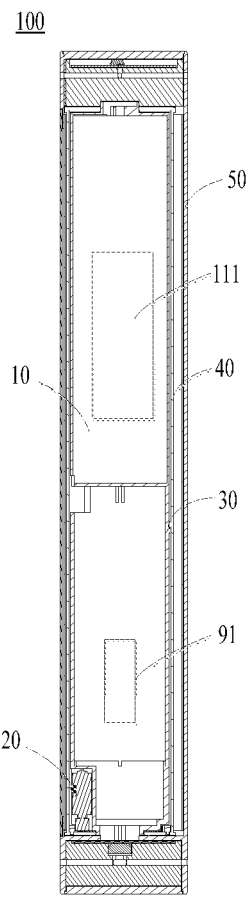
FIG. 23 is a schematic cross-sectional view of the electronic device illustrated in FIG. 22 taken along a direction A-A.
Figure 26:
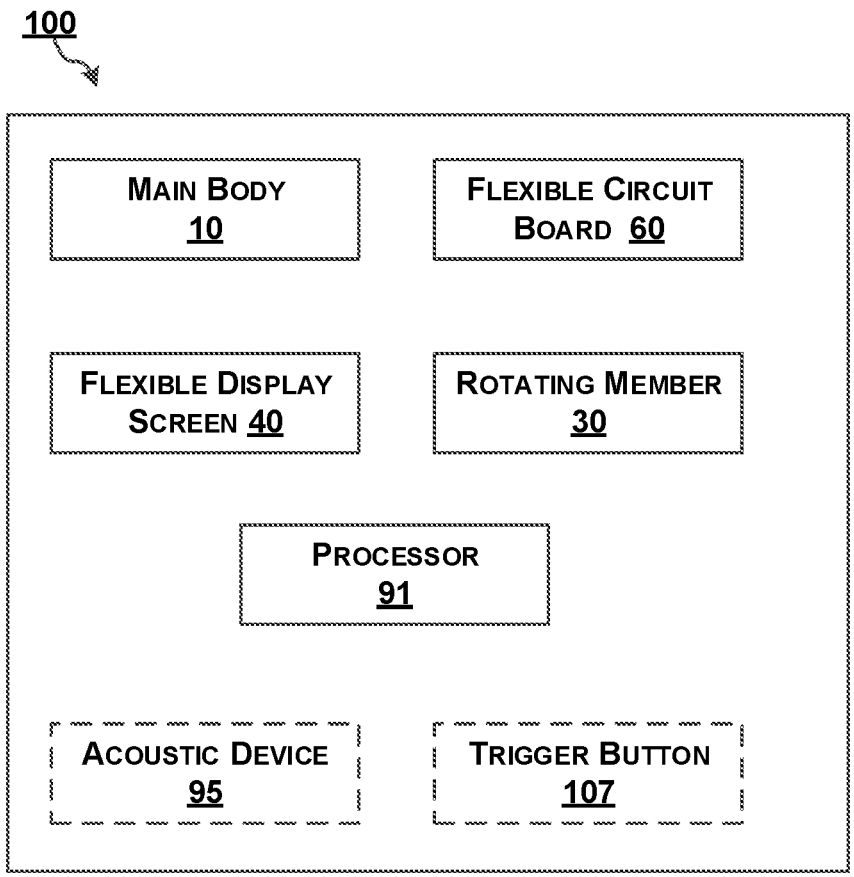
FIG. 26 is a schematic block diagram of another electronic device according to an embodiment of the present disclosure.

FIG. 26 is a schematic block diagram of another electronic device according to an embodiment of the present disclosure. Referring to FIG. 22, FIG. 22 is a schematic structural diagram of the electronic device according to an embodiment of the present disclosure. FIG. 23 is a schematic cross-sectional view of the electronic device illustrated in FIG. 22 taken along a direction A-A. Compared with the above implementations, an embodiment of the present disclosure further includes the processor 91. In some embodiments, the processor 91 is coupled to the transmission mechanism 20. The processor 91 is configured to control movement of the transmission mechanism 20 in accordance with the control instruction. The transmission mechanism 20 is configured to drive the rotating member 30 to move, and to unfold or wind the flexible display screen 40.

It is to be noted that the processor 91 may be a microprocessor 91. It can be understood that the processor 91 can be provided on the circuit board.

Figure 27:
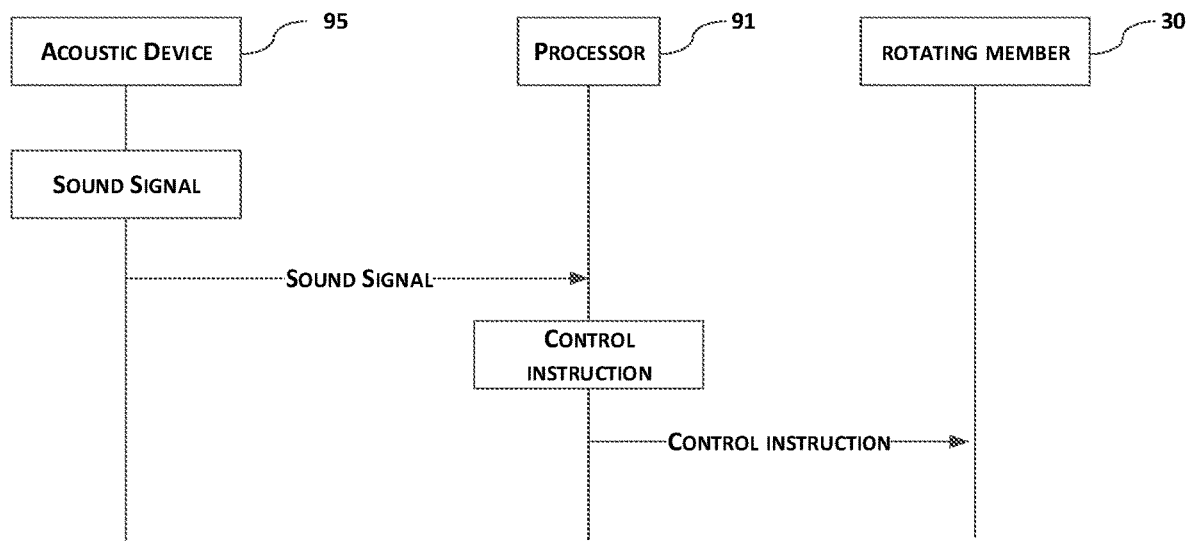
FIG. 27 illustrates an interaction process between the acoustic device 95 and the processor 91 according to an embodiment of the present disclosure.

In some embodiments, the electronic device 100 includes an acoustic device 95, as illustrated in FIG. 26. FIG. 27 illustrates an interaction process between the acoustic device 95 and the processor 91 according to an embodiment of the present disclosure. The acoustic device 95 is configured to transmit or receive a sound signal. The acoustic device 95 is coupled to the processor 91. The processor 91 is configured to generate the control instruction based on the received sound signal. It can be understood that when the acoustic device 95 receives a sound signal, the processor 91 matches the received sound signal with a preset sound signal to obtain a matching result. If the received sound signal matches the preset sound signal, then the control instruction is generated. The control instruction can control an operation of the transmission mechanism 20. Such a mode of operation is very convenient. In some occasions, the unfolding or winding of the flexible display screen 40 is controlled based on the sound signal, facilitating operations.

Figure 28:
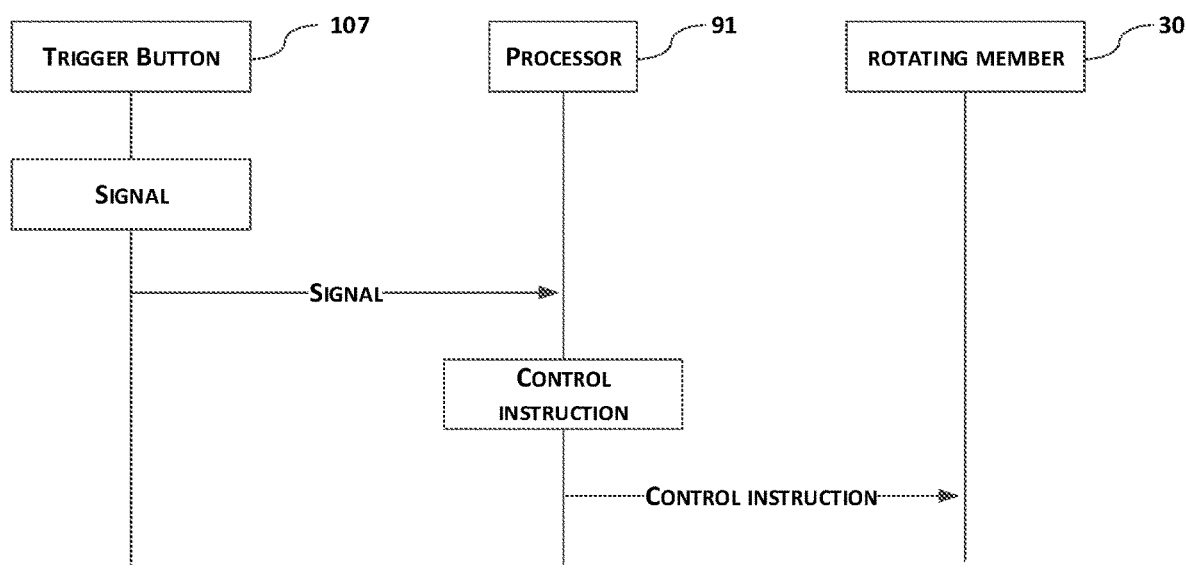
FIG. 28 illustrates an interaction process between the trigger button 107 and the processor 91 according to an embodiment of the present disclosure.

In some embodiments, with reference to FIG. 20 and FIG. 26, the electronic device 100 further includes a trigger button 107. The trigger button 107 is coupled to the processor 91. FIG. 28 illustrates an interaction process between the trigger button 107 and the processor 91 according to an embodiment of the present disclosure. As illustrated in FIG. 28, when a signal from the trigger button 107 is transmitted to the processor 91, the control instruction is generated. It is to be noted that the trigger button 107 may be arranged on the housing 50. When the trigger button 107 is pressed, the signal from the trigger button 107 is transmitted to the processor 91, which in turn generates the control instruction. Using such a control mode to control the transmission mechanism 20 can quickly unfold or wind the flexible display screen 40.

In some embodiments, the sliding operation includes sliding at a preset position in a preset direction. A specific control method may be as follows. For example, the sliding operation is performed in a first direction, and then the processor 91 controls the transmission mechanism 20 to drive the rotating member 30 to rotate in the first direction. The sliding operation is performed in a second direction, and then the processor 91 controls the transmission mechanism 20 to drive the rotating member 30 to rotate in the second direction.

In some embodiments, the sliding operation includes sliding in the preset direction after time for contacting at the preset position reaches a threshold. A specific control method may be as follows. A long press is performed on the flexible display screen 40, for example, after a long press of two seconds on the flexible display screen 40, and then the processor 91 controls the transmission mechanism 20 to drive the rotating member to rotate in the first direction. The sliding operation is performed in the second direction, and then the processor 91 controls the transmission mechanism 20 to drive the rotating member to rotate in the second direction.

The first direction and the second direction may be directions perpendicular to an axial direction of the main body 10. The first direction and the second direction may be opposite to each other. The first direction includes at least one opposite component that is opposite to at least one component of the second direction. It is to be noted that when both the first direction and the second direction are not perpendicular to the axial direction of the main body 10, each of the first direction and the second direction at least includes a component perpendicular to the axial direction of the main body 10. The rotating member 30 may rotate towards the component perpendicular to the axial direction of the main body 10.

It is to be noted that when the rotating member 30 needs to unfold the flexible display screen 40, the first direction may also be to draw a circle in a direction in which the rotating member 30 needs to be rotated. When the rotating member needs to wind the flexible display screen 40, the second direction may be drawing a reverse circle opposite to the first direction.

In some embodiments, the processor 91 can be configured to control, based on a sliding distance of the sliding operation, an angle at which the rotating member is rotated with drive of the transmission mechanism 20. The sliding distance can be a distance perpendicular to the axial direction of the main body 10.

In some embodiments, the processor 91 can be configured to control, based on a sliding force of the sliding operation, a speed at which the rotating member is rotated with drive of the transmission mechanism 20. The sliding force of the sliding operation can be a force of pressing the flexible display screen 40 of the electronic device 100. The sliding force can be detected by a pressure sensor. For example, if the sliding force of the sliding operation is larger than as expected, then the processor 91 controls the transmission mechanism 20 to drive the rotating member to rotate at a faster speed. If the sliding force of the sliding operation is smaller than as expected, then the processor 91 controls the transmission mechanism 20 to drive the rotating member 30 to rotate at a slower speed.

It is to be noted that the control instruction is not limited to any example thereof. For example, rotation of a drum is controlled in accordance with gravity, acceleration, acceleration direction, sound control, etc.

Figure 24:
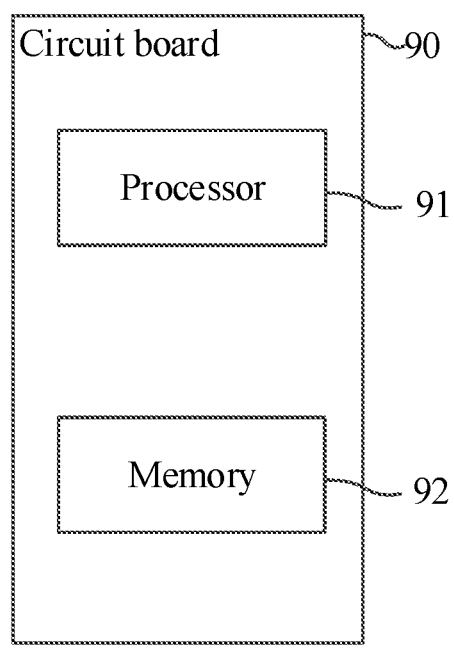
FIG. 24 is a structural block diagram of an electronic device according to an embodiment of the present disclosure.

Referring to FIG. 24, FIG. 24 is a structural block diagram of an electronic device according to an embodiment of the present disclosure. The electronic device 100 further includes a memory 92. The memory 92 can store data. For example, the memory 92 is configured to store data to be processed by the processor 91, or the memory 92 is configured to store data that has been processed by the processor 91.

The electronic device 100 can include a battery 111. The battery 111 can be provided inside the housing 50. The battery 111 can be arranged in a cuboid structure or can be arranged in a structure of a cylinder 10. The battery 111 can be electrically connected to a main board. The battery 111 can supply power to the electronic device 100. In some embodiments, the main board and the battery 111 can be disposed between the first end portion 50A and the second end portion 50B. The main board and the battery 111 can be arranged side by side inside the housing 50.

In an embodiment of the present disclosure, the housing 50 has a pillar shape. The housing 50 includes the first end portion 50A, the second end portion 50B and the side portion 50C. The first end portion 50A and the second end portion 50B are located at two opposite ends of the housing 50. The first end portion 50A or the second end portion 50B is configured to support the electronic device 100. The first end portion 50A and the second end portion 50B are connected by the side portion 50C. The main body 10 has an end connected to the first end portion 50A and another end connected to the second end portion 50B. The transmission mechanism 20 is arranged at the second end 10B of the main body 10. The rotating member 30 is sleeved on the outer periphery of the main body 10 and located in the housing 50. The transmission mechanism 20 is connected to the rotating member 30. The flexible display screen 40 is fixedly connected to the rotating member 30. The flexible display screen 40 can be wound on the rotating member 30 by the rotation of the rotating member 30 to be received in the housing 50. The processor 91 is coupled to the transmission mechanism 20. The processor 91 controls the movement of the transmission mechanism 20 in accordance with the control instruction. The transmission mechanism 20 drives the rotating member 30 to move, in such a manner that the flexible display screen 40 extends from the inside of the housing 50 to the outside of the housing 50 to achieve unfolding. The transmission mechanism 20 is controlled by the control instruction. The transmission mechanism 20 drives the rotating member 30 to move in such a manner that the flexible display screen 40 extends from the inside of the housing 50 to the outside of the housing 50 for achieving unfolding. In this way, the flexible display screen 40 can be unfolded from the housing 50 or wound into the housing 50 easily and quickly. Also, the transmission mechanism 20 is arranged at the second end portion 50B of the main body 10. Thus, the transmission mechanism 20 will not occupy the space inside the housing 50, which may facilitate arranging other functional parts in the electronic device 100.

Figure 25:
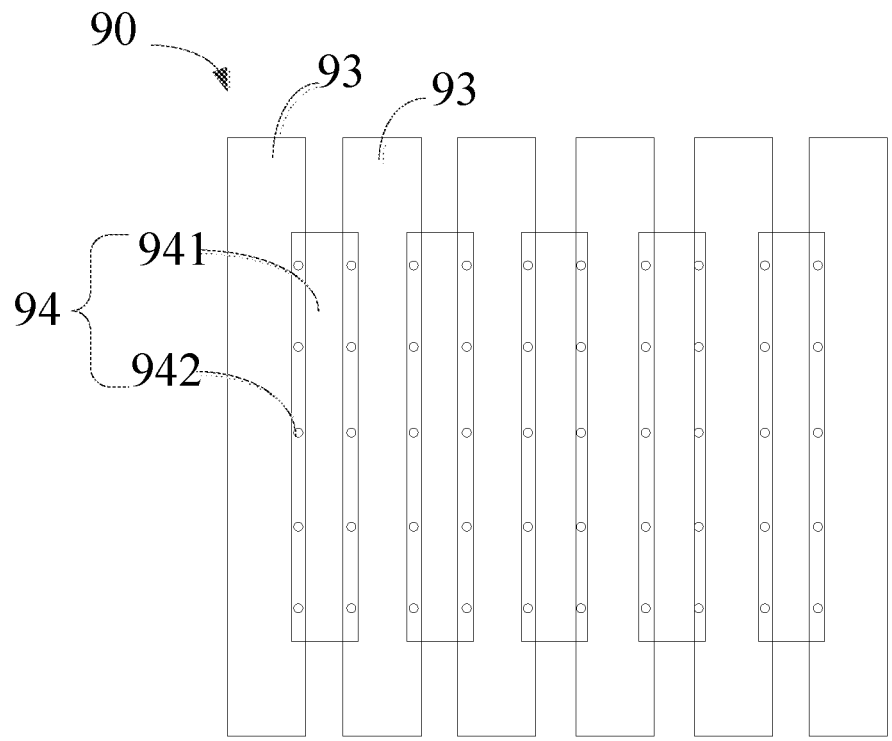
FIG. 25 is a schematic structural diagram of a circuit board of an electronic device according to an embodiment of the present disclosure.

Referring to FIG. 25, in some embodiments, the circuit board 90 is bendable. When the circuit board 90 is bent, the circuit board 90 is mounted in the fixing opening 1053 in the housing.

In some embodiments, the circuit board 90 includes at least two sub-circuit boards 93. A connecting portion 94 is provided between two of the sub-circuit boards 93. The two sub-circuit boards 93 are bent around the connecting portion 94.

In some embodiments, the connecting portion 94 includes a flexible circuit board 941 and a board-to-board connector 942. A flexible connecting plate 941 connects the sub-circuit boards 93 on two sides by the board-to-board connector 942.

In some embodiments, the two sub-circuit boards 93 have the same shapes and sizes.

In some embodiments, a length of the flexible circuit board 941 is smaller than a length of the sub-circuit board 93, and a width of the flexible circuit board 941 is smaller than a width of the sub-circuit board 93.

In some embodiments, two sub-circuit boards 93 are connected by the flexible circuit board 941. Two ends of the flexible circuit board are aligned with two ends of the sub-circuit board 93.

After the circuit board 90 is bent, it is more suitable for the circuit board 90 to be mounted in the housing of the pillar shape. A mounting area of the circuit board may be reduced after the circuit board 90 is bent, but an overall use area of the circuit board can be guaranteed. Therefore, with the circuit board that is bendable, not only the circuit board may be mounted in the housing, but also the overall use area of the circuit board can be ensured.

The electronic device according to the embodiments of the present disclosure has been described in detail above. Specific examples are used herein to illustrate principles and embodiments of the present disclosure, and description of the above embodiments is only used to facilitate understanding of the present disclosure. Also, for those skilled in the art, according to an idea of the present disclosure, any change may be made to specific embodiments and application. In summary, the contents of the present disclosure should not be construed as limiting the present disclosure.

What is claimed is:

1. An electronic device, comprising:
 a main body having a pillar shape, an outer periphery of the main body having a groove provided thereon, wherein the main body has a first end and a second end opposite to the first end, the main body comprises a first portion located at the first end and a second portion located at the second end, a minimum cross-sectional area of the first portion is greater than a minimum cross-sectional area of the second portion, and the groove is provided in the second portion;
 a rotating member sleeved on an outside of the main body;
 a flexible display screen having an end connected to the rotating member, the rotating member being configured to drive the flexible display screen to be wound or unfolded relative to the rotating member; and
 a flexible circuit board connected to the flexible display screen, wherein when the flexible display screen is unfolded, the flexible circuit board is unfolded along with the flexible display screen, and when the flexible display screen is wound, the flexible circuit board is wound into the groove along with the flexible display screen,
 wherein the second portion is provided with a package of the flexible circuit board located between the groove and the first portion.

2. The electronic device according to claim 1, wherein an outline of an orthographic projection of the package of the flexible circuit board on an end portion of the first end is smaller than a minimum cross-sectional area of the first end.

3. The electronic device according to claim 1, further comprising a drive motor and a gear set, wherein the drive motor is fixedly connected to the main body, the gear set is arranged at either end of the main body, the drive motor is fixedly connected to the gear set, and the drive motor is configured to drive the gear set to move.

4. The electronic device according to claim 3, further comprising an end cover comprising a bottom plate and a mounting portion, the bottom plate being fixed at an end portion of the second end, the mounting portion extending from the bottom plate to an outer periphery of the second portion, and the drive motor being mounted on the mounting portion.

5. The electronic device according to claim 4, further comprising a fixing cover fixed on an end of the bottom plate facing away from an end portion of the first end.

6. The electronic device according to claim 5, further comprising a fixing portion, the drive motor being mounted to the mounting portion by the fixing portion.

7. The electronic device according to claim 6, wherein the fixing portion comprises a bayonet for stopping the drive motor, and a mounting plate located on a side of the bayonet and fixedly connected to the main body.

8. The electronic device according to claim 7, wherein the drive motor is connected to a circuit board by a connecting plate, the circuit board is bendable, and when the circuit board is bent, the circuit board is fixed in the end portion of the second end of the main body.

9. The electronic device according to claim 8, wherein the circuit board comprises at least two sub-circuit boards, a connecting portion being provided between the at least two sub-circuit boards, and the at least two sub-circuit boards being bent around the connecting portion.

10. The electronic device according to claim 9, wherein the connecting portion comprises the flexible circuit board and a board-to-board connector, the flexible circuit board connecting the sub-circuit boards on two sides by the board-to-board connector.

11. The electronic device according to claim 10, wherein a housing comprises a display window, and when the flexible display screen is wounded into the housing, the flexible display screen can be displayed in the display window.

12. The electronic device according to claim 1, further comprising a housing in which the main body, the rotating member, and the flexible display screen are arranged, wherein the rotating member is configured to move in such manner that the flexible display screen is driven to unfold from an inside of the housing to an outside of the housing.

13. The electronic device according to claim 12, wherein the housing further comprises an outlet from which the flexible display screen is unfolded or wound, and wherein when the flexible display screen is housed in the housing completely, an edge of the flexible display screen seals the outlet.

14. An electronic device, comprising:
a main body having a pillar shape, an outer periphery of the main body having a groove provided thereon, wherein the main body has a first end and a second end opposite to the first end, the main body comprises a first portion located at the first end and a second portion located at the second end, a minimum cross-sectional area of the first portion is greater than a minimum cross-sectional area of the second portion, and the groove is provided in the second portion;
a rotating member sleeved on an outside of the main body;
a flexible display screen having an end connected to the rotating member, the rotating member being configured to drive the flexible display screen to be wound or unfolded relative to the rotating member;
a processor coupled to the rotating member and configured to control a movement of the rotating member in accordance with a control instruction; and
a flexible circuit board connected to the flexible display screen, wherein when the flexible display screen is unfolded, the flexible circuit board is unfolded along with the flexible display screen, and when the flexible display screen is wound, the flexible circuit board is wound into the groove along with the flexible display screen,
wherein the second portion is provided with a package of the flexible circuit board located between the groove and the first portion.

15. The electronic device according to claim 14, further comprising an acoustic device configured to receive a sound signal and coupled to the processor, the processor being configured to generate the control instruction based on the sound signal.

16. The electronic device according to claim 14, further comprising a trigger button coupled to the processor, wherein when a signal from the trigger button is transmitted to the processor, the control instruction is generated.

17. The electronic device according to claim 14, wherein the flexible display screen is configured to obtain a sliding operation, and the processor is configured to generate the control instruction in accordance with the sliding operation.

18. The electronic device according to claim 17, wherein the processor is configured to control, based on a sliding distance of the sliding operation, an angle at which the rotating member is rotated with a drive of a transmission mechanism, and to control a rotation speed of the rotating member based on a sliding force of the sliding operation.

* * * * *